United States Patent
Ciou et al.

(10) Patent No.: US 9,898,109 B2
(45) Date of Patent: Feb. 20, 2018

(54) ACTIVE STYLUS PEN AND SIGNAL TRANSMISSION METHODS FOR STYLUS PEN AND TOUCH PANEL

(71) Applicant: Silicon Integrated Systems Corp., Hsinchu (TW)

(72) Inventors: Min-Yan Ciou, Hsinchu (TW); Chin-Hua Kuo, Hsinchu (TW); Ying-Jyh Yeh, Hsinchu (TW)

(73) Assignee: SILICON INTEGRATED SYSTEMS CORP., Hsinchu (TW)

( * ) Notice: Subject to any disclaimer, the term of this patent is extended or adjusted under 35 U.S.C. 154(b) by 0 days.

(21) Appl. No.: 14/958,612

(22) Filed: Dec. 3, 2015

(65) Prior Publication Data

US 2016/0162044 A1    Jun. 9, 2016

(30) Foreign Application Priority Data

Dec. 3, 2014   (TW) ............................. 103142053 A (51) Int. Cl.
*G06F 3/038* (2013.01)
*G06F 3/041* (2006.01)
*G06F 3/044* (2006.01)
*G06F 3/0354* (2013.01)

(52) U.S. Cl.
CPC ........ *G06F 3/0383* (2013.01); *G06F 3/03545* (2013.01); *G06F 3/044* (2013.01); *G06F 3/0416* (2013.01)

(58) Field of Classification Search
CPC ...... G06F 3/0383; G06F 3/0416; G06F 3/044; G06F 3/03545
See application file for complete search history.

(56) References Cited

U.S. PATENT DOCUMENTS

2003/0117408 A1*   6/2003   Forsline .............. G06F 3/03545
                                                              345/581

* cited by examiner

*Primary Examiner* — Charles Hicks
(74) *Attorney, Agent, or Firm* — Muncy, Geissler, Olds & Lowe, P.C.

(57) ABSTRACT

The disclosure provides an active stylus pen and signal transmission methods for the active stylus pen and a touch panel. The stylus has a touch module, a switching module, a signal comparison module, a control module and a pressure sensing module. The stylus determines a first signal generated by a touch panel, and compares an intensity of the first signal and a reference value through a first transmission path. When the intensity of the first signal exceeds the reference value, the stylus outputs a second signal to the touch panel. After the stylus outputs the second signal to the touch panel, the stylus switches to a second transmission path from the first transmission path. The stylus outputs a header signal to the touch panel. When determining a first time sequential distribution, the stylus outputs at least one bit of a pressure signal according to a second time sequential distribution.

12 Claims, 5 Drawing Sheets

ACTIVE STYLUS PEN AND SIGNAL TRANSMISSION METHODS FOR STYLUS PEN AND TOUCH PANEL

CROSS-REFERENCE TO RELATED APPLICATIONS

This non-provisional application claims priority under 35 U.S.C. § 119(a) on Patent Application No(s). 103142053 filed in Taiwan, R.O.C. on Dec. 3, 2014, the entire contents of which are hereby incorporated by reference.

TECHNICAL FIELD

The disclosure relates to an active stylus pen and signal transmission methods for the active stylus pen and a touch panel thereof, more particularly to an active stylus pen having a pressure sensing function and to signal transmission methods, by which the touch panel can set a track width of a touch point in response to the pressure sensing of the active stylus pen.

BACKGROUND

To fill the needs for touch panels in different applications, various touch control methods have been promoted. Among touch panels nowadays, capacitive touch panels have advantages of a high transparency, high hardness, short response time and a high sensitivity so they are widely applied to the touch control field.

Modern control methods for a capacitive touch panel can substantially be categorized into the active touch control method and the passive touch control method. The passive touch input method is carried out by using one or more fingers or a passive stylus pen to touch a touch panel; and an active touch input method is carried out by using an active stylus pen to touch a touch panel. As compared to a passive stylus pen, an active stylus pen can actively output signals in response to the actions of a capacitive touch panel so that it can do subtler actions, such as writing and painting on the capacitive touch panel.

However, modern active stylus pens support subtle actions but do not support the pressure sensing technology whereby a capacitive touch panel cannot display a trace having a different width according to the pen pressure. Therefore, it is necessary to develop an active stylus pen having the pressure sensing technology, and a signal transmission method between the active stylus pen and a capacitive touch panel, by which the capacitive touch panel can display a trace which has a different width according to the pen pressure and looks like a real brush stoke when the active stylus pen is used to write or paint on the capacitive touch panel.

SUMMARY

The disclosure provides an active stylus pen with a pressure sensing technology and signal transmission methods applied to the active stylus pen and a touch panel, respectively. When the active stylus pen moves or acts on the touch panel, the touch panel will generate a coordinate that the active stylus pen contacts the touch panel. Also, the pressure sensing technology used in the active stylus pen allows the touch panel to set a track width. Therefore, the touch panel can display a track with a different track width according to the pressure of the active stylus pen pressing on the touch panel.

According to one or more embodiments, the active stylus pen includes a touch module, a switching module, a signal comparing module, a control module, and a pressure sensing module. The touch module detects a first signal generated by a touch panel. The switching module is electrically connected to the touch module and selectively couples to a first transmission path or a second transmission path in order to selectively transmit the detected first signal through the first transmission path or the second transmission path. The signal comparing module receives the detected first signal from the first transmission path and compares the intensity of the first signal with a reference value. When the intensity of the first signal is larger than the reference value, the signal comparing module outputs a second signal. After the signal comparing module outputs a second signal, the switching module couples to the second transmission path instead of the first transmission path to ignore a feedback signal generated when the signal comparing module outputs the second signal. The control module is electrically connected to the touch module and outputs a header signal to the touch panel so that the touch panel uses the header signal to identify the active stylus pen. The pressure sensing module encodes a pressure delta into a pressure signal according to a first time sequential distribution of the first signal and outputs at least one bit of the pressure signal according to a second time sequential distribution of the first signal.

According to one or more embodiments, the signal transmission method applied to an active stylus pen includes the following steps. First, the active stylus pen detects a first signal generated by a touch panel and compares the intensity of the first signal with a reference value through a first transmission path. When the intensity of the first signal is larger than the reference value, a second signal is outputted to the touch panel. After the active stylus pen outputs the second signal to the touch panel, the active stylus pen couples to a second transmission path instead of the first transmission path and ignores a feedback signal generated when the second signal is outputted. Then, the active stylus pen outputs a header signal to the touch panel for the identification of the active stylus pen. When the active stylus pen detects a first time sequential distribution in the first signal, a pressure delta is encoded into a pressure signal having a plurality of bits. When the active stylus pen detects a second time sequential distribution in the first signal, at least one bit of the pressure signal is outputted to the touch panel according to the second time sequential distribution of the first signal.

According to one or more embodiments, the signal transmission method applied to a touch panel includes the following steps. First, the touch panel outputs a first signal. When an active stylus pen outputs a second signal in response to the first signal, the touch panel generates a coordinate according to the second signal outputted by the active stylus pen. This coordinate indicates a position that the active stylus pen touches the touch panel, or indicates a position that the touch panel receives the second signal. Then, the touch panel detects a header signal from the active stylus pen, so as to identify the active stylus pen indicated by the header signal and then generate a communications protocol with the active stylus pen. Next, the touch panel outputs the first signal conforming to a first time sequential distribution in response to the header signal to require that the active stylus pen provides a pressure signal. Then, the touch panel outputs the first signal conforming to a second time sequential distribution in order to receive the pressure signal from the active stylus pen. The active stylus pen outputs at least one bit of the pressure signal in response to the first signal conforming to the second time sequential distribution. The touch panel determines whether the received pressure signal is correct. When the received pressure signal is correct, the touch panel sets a track width corresponding to the pressure signal at the coordinate.

As described above, the active stylus pen actively responds the touch panel so the touch panel senses the touch of the active stylus pen to obtain a coordinate. Then, the touch panel and the active stylus pen produce a communication link therebetween so the touch panel can identify the active stylus pen touching it. Next, the touch panel uses a signal with a specific time sequential distribution to require the active stylus pen to output a signal of pressure sensing result so the touch panel can set a track width at the touch position in order to display a track with a different track width according to the pressure of the active stylus pen pressing the touch panel.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
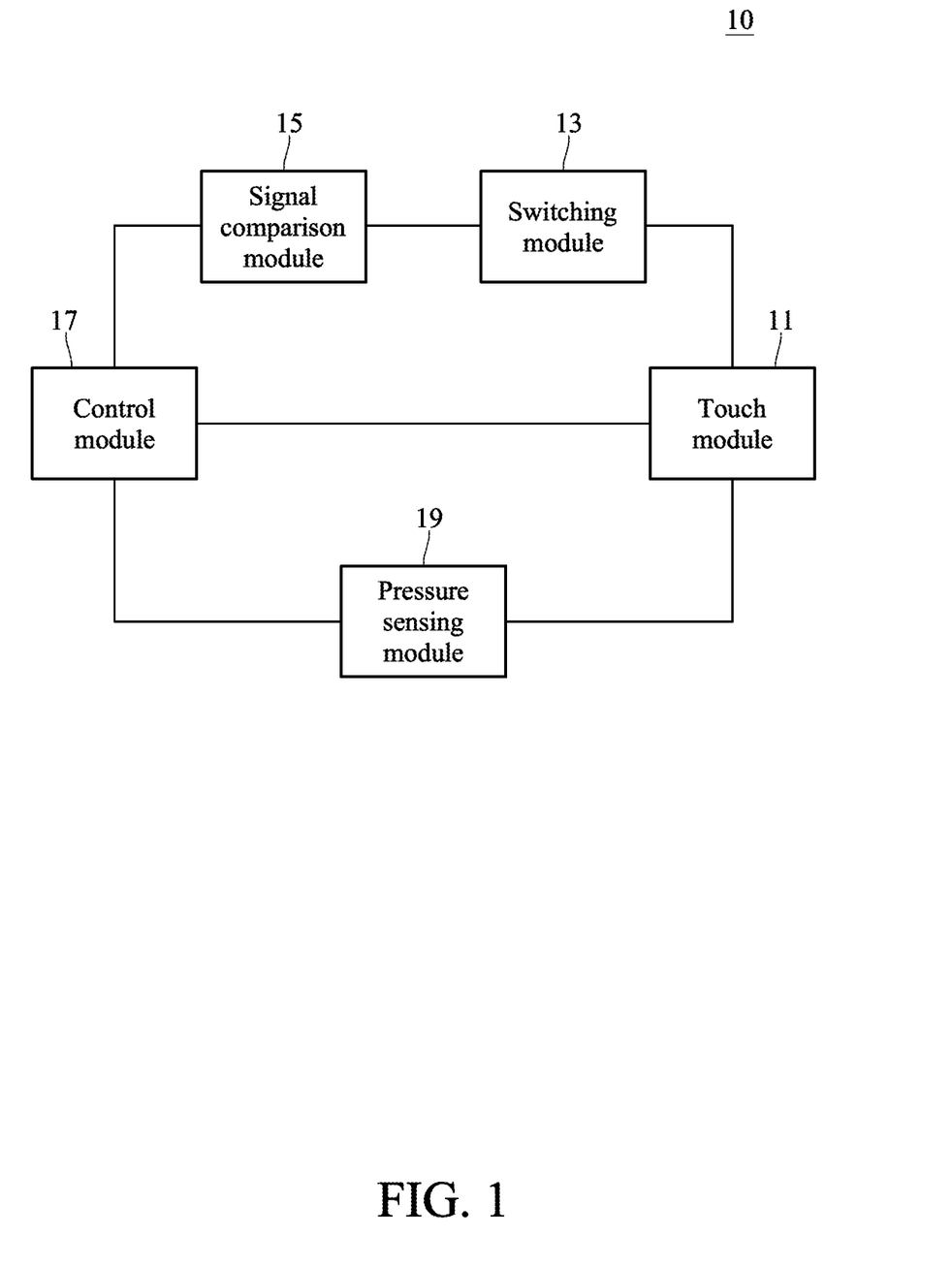
FIG. 1 is a block diagram of an active stylus pen in an embodiment.

FIG. 1 is a block diagram of an active stylus pen 10 in an embodiment. The active stylus pen 10 includes a touch module 11, a switching module 13, a signal comparing module 15, a control module 17, and a pressure sensing module 19. The touch module 11 detects a first signal generated by a touch panel. The touch module 11 is, for example, not limited to the pen head or pen tip of the active stylus pen 10, which is mainly made by conductive shielding gasket, by plastic whose surface is coated with conductive paint, by conductive silica gel, by conductive fibers, or by other conductive material, for example. The touch module 11 detects a first signal appearing above the surface of the touch panel. The first signal herein is a signal formed on the surface of the touch panel when touch panel is powered. For example, when a capacitive touch panel is powered, a signal used to charge capacitors within the capacitive touch panel is called first signal. In practice, after the capacitive touch panel is powered, the capacitors within the capacitive touch panel are individually charged. When the capacitive touch panel charges a capacitor that is touched by or close to the touch module 11, the touch module 11 will receive a signal provided by the touch panel and used to charge this capacitor. This signal is considered the first signal detected by the touch module 11. Moreover, the touch module 11 senses the first signal with a different intensity according to the distance between the touch module 11 and the touch panel.

The switching module 13 is electrically connected to the touch module 11 and selectively couples to a first transmission path or a second transmission path in order to selectively transmit the sensed first signal through the first transmission path or the second transmission path. The switching module 13 is, for example, not limited to a switch component, a multiplexer or other component supporting selectively coupling. An input terminal of the switching module 13 is coupled to the touch module 11 in order to receive the first signal sensed by the touch module 11, and an output terminal of the switching module 13 selectively couples to the first transmission path or the second transmission path. For example, the first transmission path is used to transmit the first signal to the signal comparing module 15, and the second transmission path is used to transmit a feedback signal generated when the active stylus pen 10 outputs a signal.

The signal comparing module 15 receives the first signal, detected by the touch module 11, from the first transmission path in order to compare the intensity of the first signal with a reference value. When the intensity of the first signal is larger than the reference value, it indicates that the active stylus pen 10 has touched the touch panel, or that the distance between the active stylus pen 10 and the touch panel is sufficiently short to display a trace of the active stylus pen 10 above the touch panel. Herein, the signal comparing module 15 outputs a second signal to the touch panel so that the touch panel generates a coordinate in response. The second signal is an inverse of the first signal in an embodiment. For example, while the first signal is a signal used to charge the capacitors in the touch panel, the second signal is outputted by the active stylus pen 10 to interference the signal used to charge the capacitors within the touch panel and is a signal used to discharge the charged capacitors within the touch panel. The active stylus pen 10 outputs the second signal opposite to the first signal to the touch panel so that the touch panel will detect the variations of capacitor voltages therein to obtain a position of the active stylus pen 10 touching or being close to the touch panel. Such a coordinate is associated with a position where the second signal is received by the touch panel, or is considered a point on the touch panel which the active stylus pen 10 touches on. After the signal comparing module 15 outputs the second signal, the switching module 13 couples to the second transmission path instead of the first transmission path to ignore a feedback signal generated when the signal comparing module 15 outputs the second signal.

In an embodiment, the switching module 13 stores information about a preset switching frequency or a preset switching time. Specifically, the switching module 13 couples to the first transmission path instead of the second transmission path when a preset switching time is expired after the switching module 13 couples to the second transmission path instead of the first transmission path. Alternatively, the switching module alternately couples to the first transmission path and the second transmission path in the preset switching frequency.

The control module 17 is electrically connected to the touch module 11 and outputs a header signal to the touch panel so that the touch panel can identify the active stylus pen 10 according to the header signal. For example, the header signal indicates the identity of the active stylus pen 10. When the active stylus pen 10 is close to or touches the touch panel, the active stylus pen 10 actively sends the header signal to the touch panel. Then, the touch panel conforms that a device touching the touch panel is the active stylus pen 10 rather than a finger or a passive stylus pen according to the identity of the active stylus pen 10 indicated by the header signal, so as to operate in response to the input of the active stylus pen 10. Sending the header signal from the active stylus pen 10 to the touch panel can be performed after the active stylus pen 10 outputs the second signal, or can be performed while the active stylus pen 10 is close to the touch panel (i.e. the active stylus pen starts detecting the first signal). Outputting the header signal to the touch panel by the active stylus pen 10 and conforming the identity of the active stylus pen 10 by the touch panel can be considered a communications protocol that the touch panel can handshake with the active stylus pen 10. After the communications protocol that the touch panel can handshake with the active stylus pen 10 is generated, the touch panel conforms the identity of the active stylus pen 10 and then requires that the active stylus pen 10 provides a pressure signal for the touch panel to set a track width at the aforementioned coordinate.

The pressure sensing module 19 encodes the pressure delta into a pressure signal according to the first time sequential distribution of the first signal and outputs at least one bit of the pressure signal according to the second time sequential distribution of the first signal. For example, the pressure sensing module 19 coupled to the touch module 11 detects a pressure delta generated by the touch module 11 and detects whether the first signal outputted by the touch panel appears the first time sequential distribution. In an example with respect to the first signal being a square wave signal, the first time sequential distribution consists of successive square waveform sections. When the pressure sensing module 19 receives multiple successive square waves waveform sections, the pressure sensing module 19 figures out whether the number of raising edges of square-wave pulses matches a reference number, thereby determining whether the received first signal confirms the first time sequential distribution. When the pressure signal determines that the number of raising edges of pulses in the first signal matches the reference number, it is considered that the first time sequential distribution is detected in the first signal. Therefore, the pressure sensing module 19 encodes the pressure delta into the pressure signal.

After the pressure sensing module 19 encodes the pressure delta into the pressure signal, the pressure sensing module 19 detects whether a second time sequential distribution appears in the first signal outputted by the touch panel, and outputs at least one bit of the pressure signal according to each raising edge of pulses in the second time sequential distribution. In an example with respect to a square wave signal, when the pressure signal is a 7-bit signal, the touch panel can output a second time sequential distribution of 7 square waveform sections. Whenever a rising edge of a square waveform section is sensed in the second time sequential distribution, the pressure sensing module 19 will output a bit of the pressure signal to the touch panel.

In addition to generating the pressure signal, the pressure sensing module 19 also combines the header signal sent by the active stylus pen 10 and the pressure signal together and sends the combination result to the touch panel. When the touch panel receives information including the header signal and the pressure signal, the touch panel determines whether the pressure signal sent by the active stylus pen 10 is correct according to the header signal received during the handshaking. Accordingly, even if one or more fingers and the active stylus pen 10 simultaneously touch the touch panel, the touch panel still can discriminate the active stylus pen 10 from the one or more fingers and then sets a track width of a trace displayed at the coordinate of the touch point of the active stylus pen 10 on the touch panel.

As shown in FIG. 1, the control module 17 is coupled to the signal comparing module 15 and the pressure sensing module 19 so can receive the second signal outputted by the signal comparing module 15 and the pressure signal outputted by the pressure sensing module 19 and send the second signal and the pressure signal to the touch module 11. In another embodiment, the signal comparing module 15 and the pressure sensing module 19 are directly coupled to the touch module 11 and output the second signal and the pressure signal to the touch module 11, respectively.

As shown in FIG. 1, the pressure sensing module 19 determines whether the first time sequential distribution and the second time sequential distribution appear in the first signal. In another embodiment, the control module 17 determines whether the first time sequential distribution and the second time sequential distribution appear in the first signal, and sends the determination result to the pressure sensing module 19 so the pressure sensing module 19 encodes the pressure delta into the pressure signal and outputs the pressure signal in response.

Figure 2:
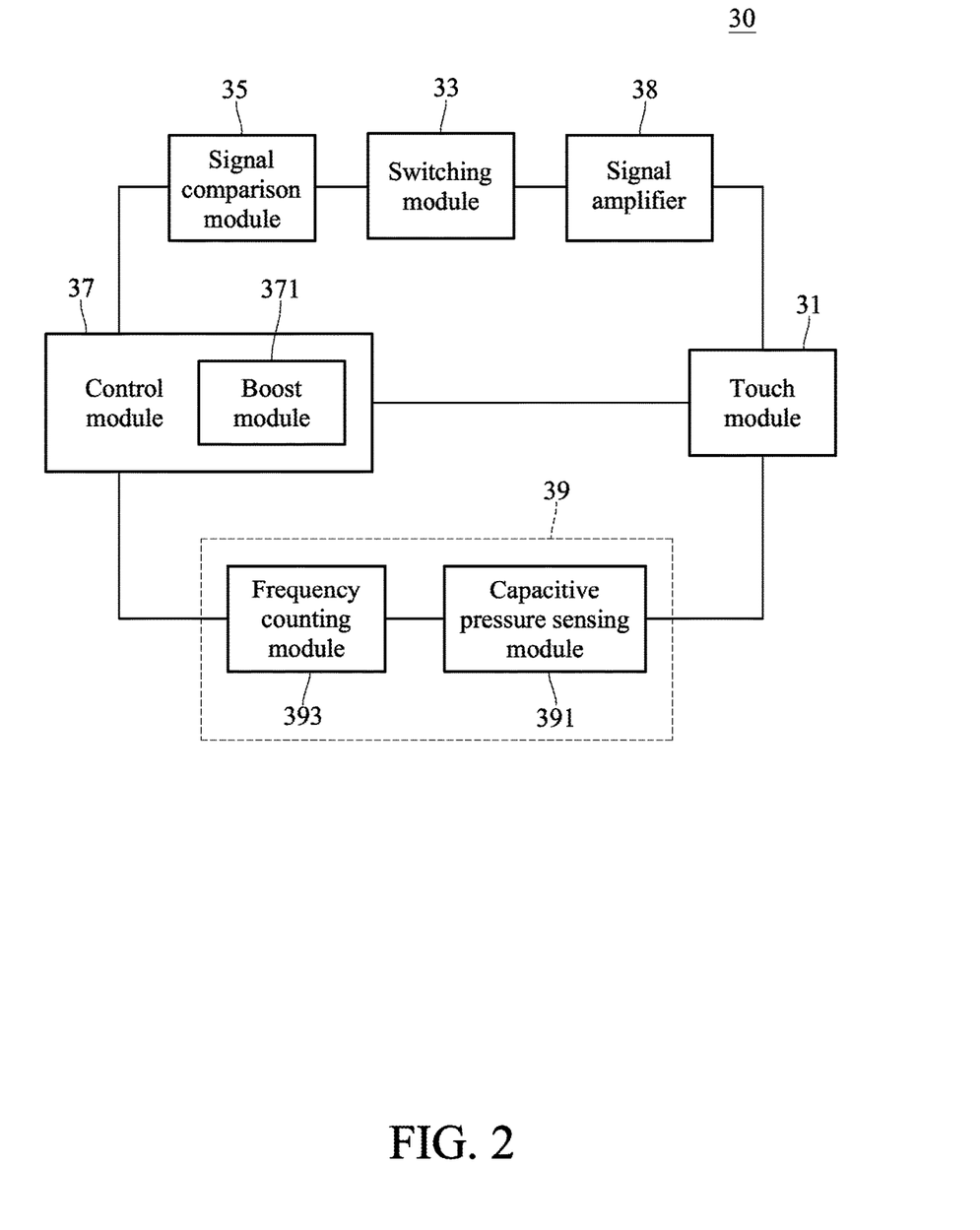
FIG. 2 is a block diagram of an active stylus pen in another embodiment.
Figure 3:
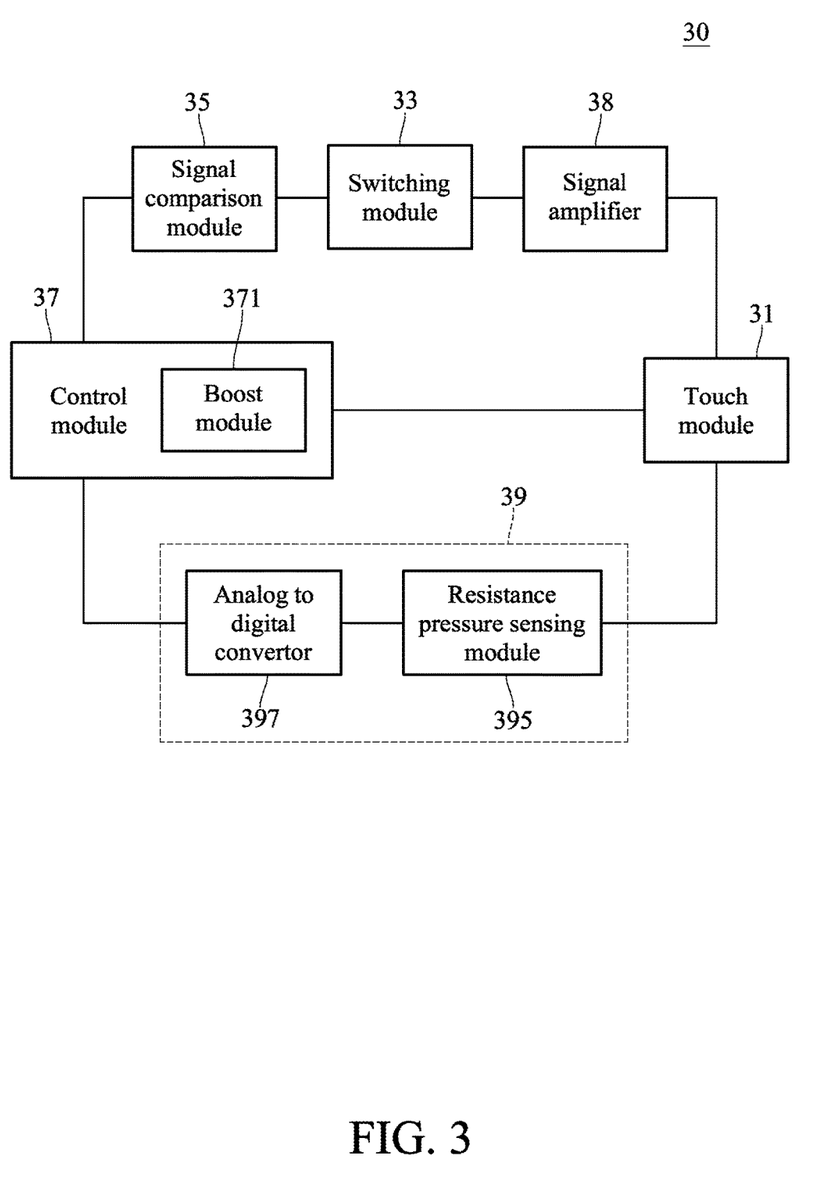
FIG. 3 is a block diagram of an active stylus pen in yet another embodiment.

Please refer to FIG. 2 and FIG. 3. FIG. 2 is a block diagram of an active stylus pen 30 in another embodiment, and FIG. 3 is a block diagram of an active stylus pen 30 in yet another embodiment. The active stylus pen 30 includes a touch module 31, a switching module 33, a signal comparing module 35, a control module 37, a signal amplifier 38, and a pressure sensing module 39. The touch module 31, the switching module 33 and the signal comparing module 35 are substantially the same as the touch module 11, the switching module 13 and the signal comparing module 15 in FIG. 1 and thus, will not be repeated hereinafter.

As compared to the active stylus pen 10 in FIG. 1, the active stylus pen 30 in FIG. 2 further includes the signal amplifier 38. The signal amplifier 38 is coupled to the touch module 31 and the switching module 33. The signal amplifier 38 amplifies the first signal sensed by the touch module 31 and outputs the amplified first signal to the switching module 33. The signal amplifier 38 receives the first signal through its input terminal Vin, amplifies the first signal or converts the first signal into a pulse signal, and outputs the amplified first signal or the pulse signal to the switching module through its output terminal Vout.

In this embodiment, the control module 37 further includes a boost module 371. The boost module 371 is coupled to the touch module 31. The boost module 371 increases a signal or a voltage provided to the touch module 31 by the control module 37 and then outputs the increased signal or voltage to the touch module 31. Increasing signal is increasing the amplitude of the signal or is converting the signal into pulses and then increasing the levels of the pulses. For example, after the signal comparing module 35 compares the intensity of the first signal with a reference value, the signal comparing module 35 outputs a second signal to the control module 37. After the boost module 371 increases the second signal, the control module 37 outputs the increased second signal to the touch module 31. Comparing the intensity of the first signal with the reference value by the signal comparing module 35 is made, for example, not limited to, by comparing the amplitude of the first signal with the reference value, by comparing the middle voltage or voltage delta between the maximum peak and the minimum peak in the first signal with the reference value, or by other way.

As shown in FIG. 2, the pressure sensing module 39 includes a capacitive pressure sensing module 391 and a frequency counting module 393. The capacitive pressure sensing module 391 senses the capacitance variations occurring on the touch module 31 when a user writes or paints on the touch panel, and the frequency counting module 393 calculates the capacitance variation per second and uses the capacitance variation per second to calculate a pressure value that the active stylus pen 30 presses on the touch panel during writing or painting. The frequency counting module 393 converts and encodes the pressure value into a pressure signal and outputs the pressure signal to the control module 37.

In another embodiment shown in FIG. 3, the pressure sensing module 39 includes a resistance pressure sensing module 395 and an analog to digital convertor 397. The resistance pressure sensing module 395 is, for example, not limited to a bridge circuit consisting of variable resistors, which is used to sense the voltage variation occurring on the touch module 31 during the user's writing or painting. Then, the analog to digital convertor 397 converts the voltage variation into a pressure delta that is used to figure out a pressure signal corresponding to the pressure which the user exerts on the active stylus pen 30. For example, the resistance pressure sensing module 395 presets that the voltage variation corresponding to the pen pressure per 10 grams is 0.05 Volt (V), and when the user is using the active stylus pen 30, the resistance pressure sensing module 395 and the analog to digital convertor 397 will cooperate to calculate a voltage variation of 0.5V. If the maximum voltage variation is 3V, a ratio of 0.5V to 3V is about 0.167. Accordingly, the pressure signal corresponding to the voltage variation will indicate that the touch panel should set the track width to be 0.167 times a maximum track width.

Figure 4:
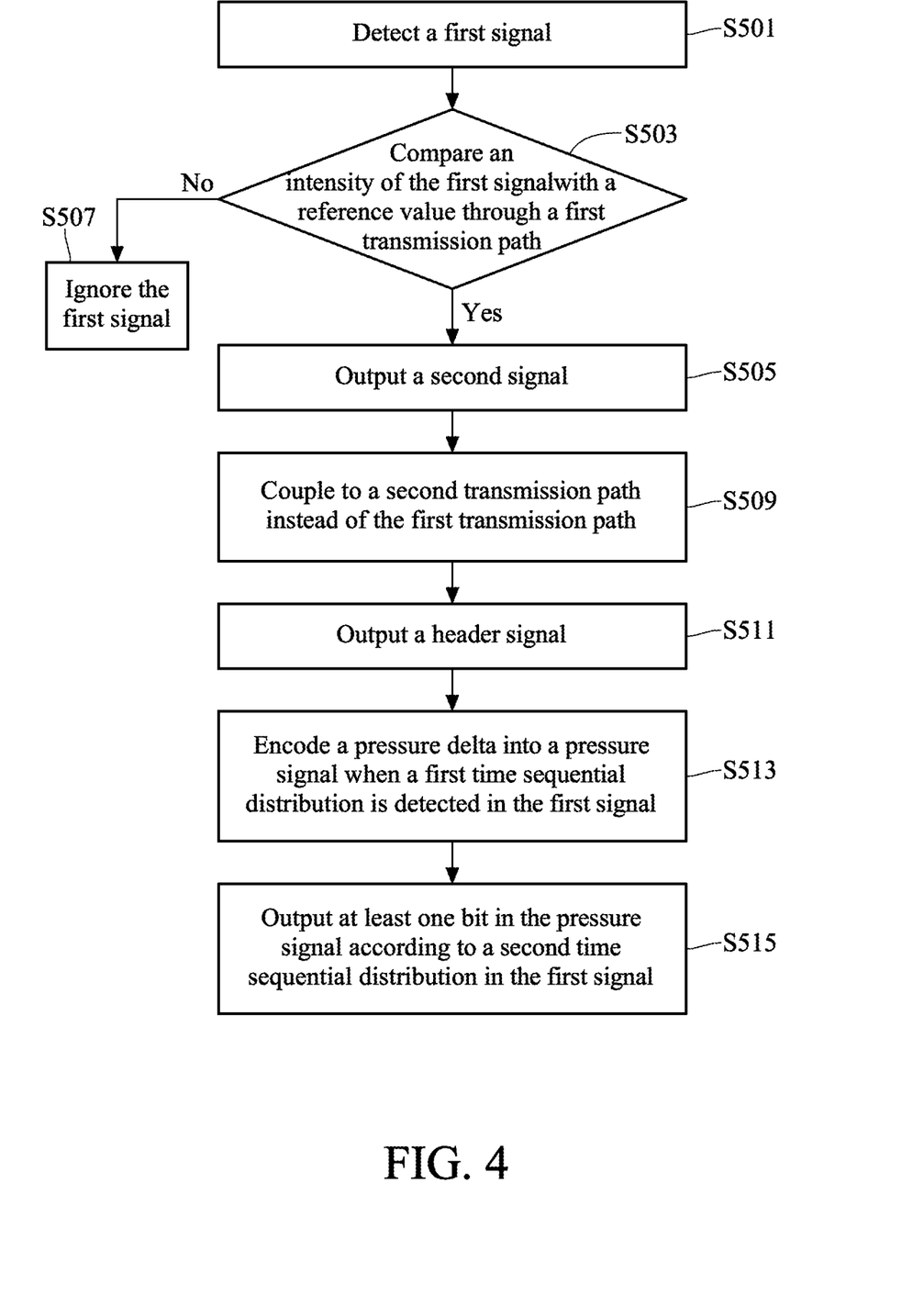
FIG. 4 is a flow chart of a signal transmission method applied to the active stylus pen in an embodiment.

Please refer to FIG. 4, where a flow chart of a signal transmission method applied to the above active stylus pen in an embodiment is shown. The signal transmission method includes the following steps. In step S501, the active stylus pen detects a first signal generated by a touch panel. The intensity of the first signal sensed by the active stylus pen is associated with a distance between the active stylus pen and the touch panel. While the active stylus pen is closer to the touch panel, the first signal sensed by the active stylus pen has a higher level.

In step S503, the active stylus pen compares the intensity of the first signal with a reference value through a first transmission path. In an embodiment, the active stylus pen can compare the intensity of the first signal with the reference value after amplifying the first signal. In this step, comparing the intensity of the first signal with the reference value can be considered the detection of the distance between the active stylus pen and the touch panel so if the distance between the active stylus pen and the touch panel is short enough or they touch together, the signal transmission between the active stylus pen and the touch panel will be allowable.

When the intensity of the first signal is higher than the reference value, it indicates that the distance between the active stylus pen and the touch panel is sort enough. Therefore, in step S505, a second signal is outputted to the touch panel, and the touch panel generates a coordinate of a touch point where the touch panel receives the second signal. When the intensity of the first signal is not higher than the reference value, it indicates that the distance between the active stylus pen and the touch panel is not short enough. Herein, the first signal will be ignored in step S507.

After the active stylus pen outputs the second signal to the touch panel, the active stylus pen in step S509 couples to the second transmission path instead of the first transmission path, so as to ignore a feedback signal generated when the second signal is outputted. In order to highlight the purpose of step S509, the following negative example is used. Assume the active stylus pen is not disposed with the second transmission path to ignore the feedback signal generated when the second signal is outputted. Then, the signal amplifier or the signal comparing module in the active stylus pen will receive the feedback signal and consider it a signal provided by the touch panel so amplify it or compare it with the reference value and output another second signal caused by the feedback signal. This new second signal will cause another feedback signal, leading to the unceasing output of signal. That is why the disclosure switches from the use of the first transmission path to the use of the second transmission path during the output of the second signal in order to ignore or filter off the feedback signal.

Then, in step S511, the active stylus pen outputs to the touch panel a header signal indicating the active stylus pen. As described above, the touch panel can use the header signal to verify the identity of the active stylus pen. Therefore, in step S511, a communications protocol that the active stylus pen handshakes with the touch panel is made, and the touch panel cooperates with the active stylus pen using the communications protocol. In other words, when the active stylus pen outputs the header signal to the touch panel, the touch panel can confirm that a device touching thereon is the active stylus pen rather than a passive stylus pen and the user's finger. Accordingly, the touch panel sets a track width of a touch point at the coordinate of the touch point.

Next, in step S513, when the active stylus pen detects the first time sequential distribution in the first signal, the active stylus pen encodes the pressure delta into a pressure signal having multiple bits. For example, the first time sequential distribution is a number of pulses, the amount of rising edges of which matches a reference number. In an example, if the reference number is 3 and the active stylus pen senses three rising edges of three pulses in the first signal, the active stylus pen will consider that the first time sequential distribution has been sensed in the first signal. Then, the active stylus pen encodes the pressure delta into a pressure signal having multiple bits. Such a pressure delta is a difference between a pressure sensed by the pen head of the active stylus pen in use and another pressure sensed by the pen head of the idle active stylus pen. In other words, when the user has not used the active stylus pen, a first pressure used by the pen head of the active stylus pen is set as a pressure basis; and when the user is using the active stylus pen to write or paint on the touch panel, a second pressure can be sensed by the active stylus pen. Such a pressure delta is the second pressure minus the first pressure. In an embodiment, such a pressure delta is encoded using an encoding scheme for both the active stylus pen and the touch panel. In another embodiment, the header signal or the identity of the active stylus pen in the header signal is also encoded into the pressure signal.

In step S515, when the active stylus pen senses the second time sequential distribution appearing in the first signal, the active stylus pen outputs at least one bit of a pressure signal to the touch panel according to the second time sequential distribution of the first signal. For example, the second time sequential distribution is a signal with pulses. Whenever the active stylus pen senses a rising edge of a pulse in the second time sequential distribution, the active stylus pen outputs a bit of the pressure signal. In other words, if the pressure signal has 7 bits, the second time sequential distribution includes 7 pulses and the active stylus pen outputs one of the 7 bits whenever sensing a rising edge of the 7 pulses in the second time sequential distribution.

Figure 5:
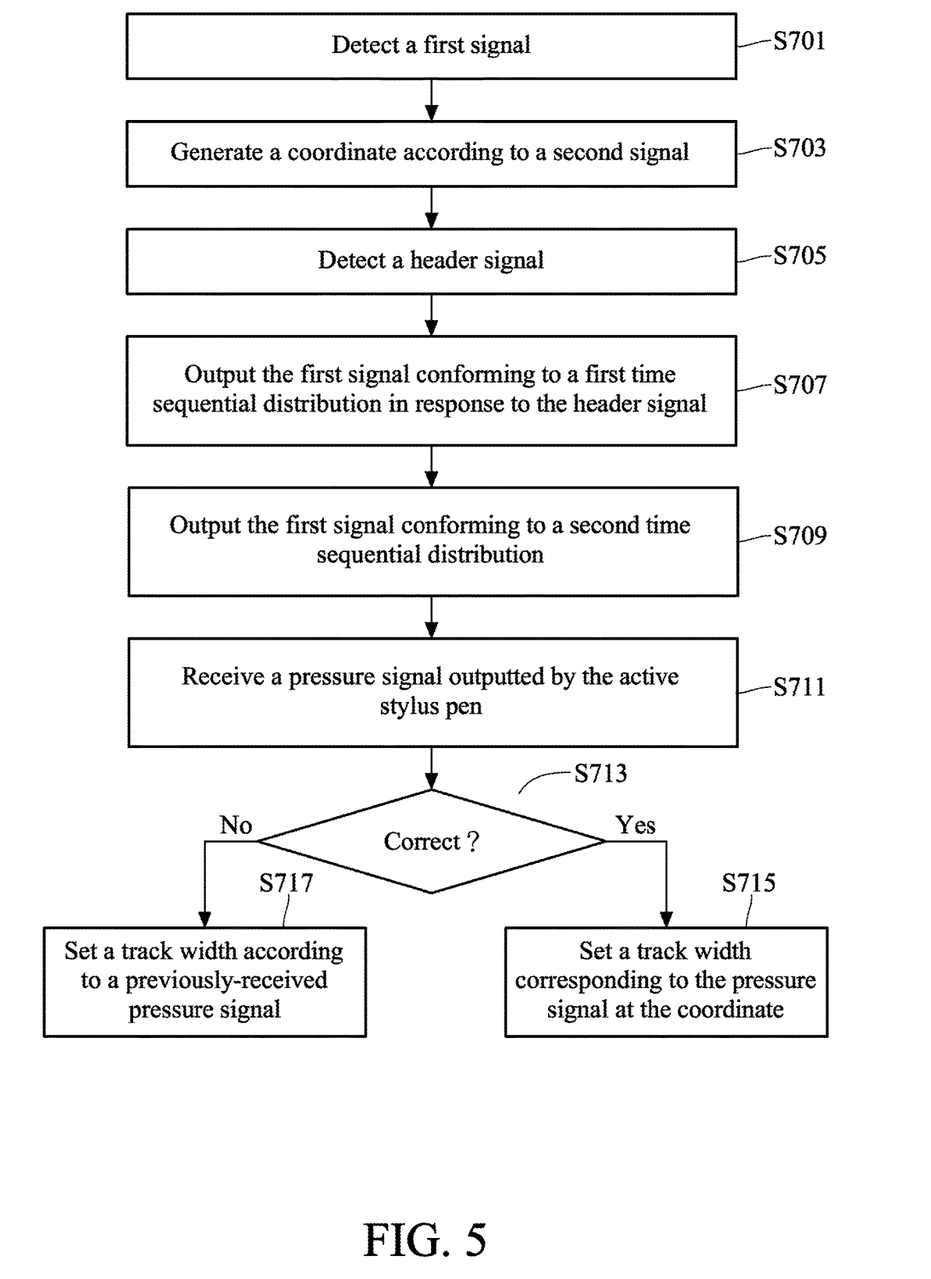
FIG. 5 is a flow chart of a signal transmission method applied to the touch panel in an embodiment.

Please refer to FIG. 5. FIG. 5 is a flow chart of a signal transmission method applied to the touch panel in an embodiment. This signal transmission method includes the following steps. In step S701, the touch panel outputs a first signal. If this touch panel is a capacitive touch panel, for example, the first signal is an electric field formed by surface electrodes when the touch panel is powered, and this first signal is used to sense the variations of capacitance caused by the active stylus pen, the passive stylus pen or the user's finger.

When the active stylus pen outputs a second signal in response to the first signal, the touch panel in step S703 generates a coordinate according to the second signal outputted by the active stylus pen. This coordinate is associated with a position of a touch point that the active stylus pen touches the touch panel, or is associated with a position that the touch panel receives the second signal thereon.

Then, in step S705, the touch panel detects a header signal outputted by the active stylus pen in order to identify the active stylus pen indicated by the header signal. When it is confirmed that a device touching the touch panel is the active stylus pen, a communications protocol, which the touch panel handshakes with the active stylus pen, will be formed. In this embodiment, after the communications protocol is formed, the touch panel performs under an operation mode conforming to the operation of the active stylus pen. The touch panel coordinates with the active stylus pen by hardware, firmware, software applications or the like.

Next, in step S707, the touch panel outputs the first signal having a first time sequential distribution in response to the header signal, so as to require the active stylus pen to provide a pressure signal. When the active stylus pen detects that the first signal has the first time sequential distribution, the active stylus pen will encode a pressure delta into the pressure signal of multiple bits. Subsequently, the touch panel outputs the first signal having a second time sequential distribution to the active stylus pen in step S709 so receives the pressure signal from the active stylus pen in step S711. For example, when the touch panel outputs a square wave signal, the active stylus pen will sense this signal and then output at least one bit of the pressure signal according to each rising edge of the square wave signal. Whenever a square waveform section of the square wave signal is outputted, the touch panel receives at least one bit of the pressure signal until all bits of the pressure signal are received.

In step S713, the touch panel determines whether the received pressure signal is correct. In an example with respect to a 7-bit pressure signal, four bits of the 7-bit pressure signal are data bits used to indicate the pressure delta, and the other three bits are verification bits. After the touch panel outputs 7 square waves, the touch panel decodes the pressure signal and checks the verification bits are correct. When the verification bits are correct, a decision whether the received pressure signal is correct is made.

In step S717, when the received pressure signal is correct, a track width will be set at the coordinate of a touch point that the active stylus pen touches the touch panel, according to the pressure signal. In contrast, when the received pressure signal is incorrect, the track width will be set according to a previously-received pressure signal, as shown in step S719.

In an embodiment, the touch panel automatically operates in an operation mode in order to cooperate with the active stylus pen after the communications protocol that the active stylus pen handshakes with the touch panel is generated. In another embodiment, the user can directly asks the touch panel to operate in an operation mode in order to cooperate with the active stylus pen. For example, when the user is using a graphic app, a notepad app or other possible apps and using the active stylus pen to write or paint on the touch panel, the touch panel sets the track width of the touch point at the coordinate of the touch point in response to the pen pressure.

As set forth above, the active stylus pen in the disclosure generates the second signal in response to the first signal generated by the touch panel so the touch panel generates a coordinate according to the second signal. Then, the active stylus pen outputs the header signal to the touch panel to try communicating with the touch panel, and the touch panel also can use this header signal to confirm that the device touching it is the active stylus pen. Next, the touch panel outputs another first signal conforming to the first time sequential distribution in order to require the active stylus pen to provide it with the pressure signal so the touch panel can set the track width of the touch point at the position of the touch point according to the pressure signal. In this way, the touch panel may be able to display traces with different widths according to various pressures which the user presses the active stylus pen by.

What is claimed is:

1. An active stylus pen, comprising:
    a touch module configured to detect a first signal;
    a switching module electrically connected to the touch module;
    a signal comparing module configured to compare an intensity of the first signal with a reference value through a first signal path when electrically connected to the touch module through the switching module, and to output a second signal when the intensity of the first signal is larger than the reference value;
    a control module electrically connected to the touch module and the signal comparing module and configured to output a header signal indicating an identity of the active stylus pen; and
    a pressure sensing module configured to encode a pressure delta into a pressure signal when a waveform of the first signal matches a first condition, and output at least one bit of the pressure signal when the waveform of the first signal matches a second condition,
    wherein after the signal comparing module outputs the second signal, the electrical connection between the signal comparing module and the touch module is cut off via the switching module.

2. The active stylus pen according to claim 1, wherein through the switching module, the signal comparing module is electrically reconnected to the touch module when the electrical connection between the signal comparing module and the touch module has been cut off for a preset time.

3. The active stylus pen according to claim 1, wherein the first condition is whether the number of pulses in the first signal matches a reference number; and when the number of pulses in the first signal matches the reference number, the control module controls the pressure sensing module to encode the pressure delta into the pressure signal.

4. The active stylus pen according to claim 3, wherein the second condition is the occurrence of a rising edge of a pulse of the first signal, and the control module controls the pressure sensing module to output the at least one bit of the pressure signal whenever detecting a rising edge of a pulse of the first signal.

5. A signal transmission method applied to an active stylus pen and comprising:
- detecting a first signal via a touch module in the active stylus pen;
- comparing an intensity of the first signal with a reference value via a signal comparing module in the active stylus pen when an electrical connection between the touch module and the signal comparing module is enabled;
- outputting a second signal when the intensity of the first signal is larger than the reference value;
- cutting off the electrical connection between the touch module and the signal comparing module when the second signal is outputted;
- outputting a header signal indicating an identity of the active stylus pen;
- encoding a pressure delta into a pressure signal when a waveform of the first signal matches a first condition; and
- outputting at least one bit in the pressure signal when the waveform of the first signal matches a second condition.

6. The signal transmission method according to claim 5, wherein the first condition is whether the number of pulses in the first signal matches a reference number; and
- when the number of pulses in the first signal matches the reference number, the pressure delta is encoded into the pressure signal.

7. The signal transmission method according to claim 5, wherein the second condition is the occurrence of a rising edge of a pulse of the first signal; and the at least one bit in the pressure signal is outputted whenever a rising edge of a pulse of the first signal is detected.

8. A signal transmission method applied to a touch panel and comprising:
- outputting a first signal;
- generating a coordinate according to a second signal, which is outputted by an active stylus pen according to an intensity of the first signal;
- detecting a header signal indicating an identity of the active stylus pen;
- outputting the first signal conforming to a first condition, in response to the header signal;
- outputting the first signal conforming to a second condition;
- receiving at least one bit in a pressure signal that is outputted by the active stylus pen in response to the first signal conforming to the second condition;
- determining whether the received pressure signal is correct, by checking a verification bit in the received pressure signal or checking the header signal; and
- setting a track width corresponding to the pressure signal at the coordinate when the received pressure signal is correct, wherein the track width is obtained by converting a pressure value corresponding to the pressure signal.

9. The signal transmission method according to claim 8, wherein when the number of pulses in the first signal matches a reference number, the first signal conforms to the first condition.

10. The signal transmission method according to claim 8, wherein the second condition is the occurrence of a rising edge of a pulse of the first signal, and whenever a rising edge of a pulse of the first signal is detected, the at least one bit in the pressure signal is received.

11. The signal transmission method according to claim 8, wherein the pressure signal is sent together with the header signal by the active stylus pen, and determining whether the received pressure signal is correct, by checking the header signal comprises:
- determining whether the header signal sent together with the pressure signal matches a handshake header signal received during handshaking; and
- determining that the received pressure signal is correct when the header signal and the handshake header signal match each other.

12. The signal transmission method according to claim 8, wherein converting the pressure value into the track width comprises:
- calculating a ratio between a maximum voltage variation of the active stylus pen and a voltage variation corresponding to the pressure value; and
- calculating the track width based on the ratio and a maximum track width corresponding to the maximum voltage variation.

* * * * *